(12) United States Patent
Schoebel

(10) Patent No.: US 12,398,782 B2
(45) Date of Patent: Aug. 26, 2025

(54) RATCHET TIGHTENER

(71) Applicant: WESTDEUTSCHER DRAHTSEIL-VERKAUF DOLEZYCH GMBH & CO. KG, Dortmund (DE)

(72) Inventor: Uwe Schoebel, Froendenberg (DE)

(73) Assignee: WESTDEUTSCHER DRAHTSEIL-VERKAUF DOLEZYCH GMBH & CO KG, Dortmund (DE)

( * ) Notice: Subject to any disclaimer, the term of this patent is extended or adjusted under 35 U.S.C. 154(b) by 0 days.

(21) Appl. No.: 18/022,224

(22) PCT Filed: Aug. 23, 2021

(86) PCT No.: PCT/EP2021/073225
§ 371 (c)(1),
(2) Date: Feb. 20, 2023

(87) PCT Pub. No.: WO2022/053293
PCT Pub. Date: Mar. 17, 2022

(65) Prior Publication Data
US 2025/0215956 A1    Jul. 3, 2025

(30) Foreign Application Priority Data
Sep. 10, 2020  (DE) .......................... 202020105227.6

(51) Int. Cl.
*F16G 11/12*    (2006.01)
*B60P 7/08*    (2006.01)
(52) U.S. Cl.
CPC .............. *F16G 11/12* (2013.01); *B60P 7/083* (2013.01)

(58) Field of Classification Search
CPC ........ F16G 11/12; B60P 7/083; B60P 7/0823; F16B 41/002
USPC .......................................... 411/352, 353, 999
See application file for complete search history.

(56) References Cited

U.S. PATENT DOCUMENTS

| 1,102,782 | A | * | 7/1914 | Mills ........................ | F16G 11/12 |
| | | | | | 188/196 R |
| 2,120,497 | A | * | 6/1938 | Heinrich ................. | F16G 11/12 |
| | | | | | 269/130 |
| 2,168,126 | A | * | 8/1939 | Kane ........................ | B25B 1/205 |
| | | | | | 269/130 |
| 4,130,269 | A | | 12/1978 | Schreyer | |
| 9,103,405 | B2 | | 8/2015 | Smetz | |

(Continued)

FOREIGN PATENT DOCUMENTS

| DE | 720193 B | 4/1942 |
| EP | 1588975 A | 10/2005 |
| WO | 2020202673 A | 1/2022 |

*Primary Examiner* — Jack W Lavinder
(74) *Attorney, Agent, or Firm* — Andrew

(57) ABSTRACT

The invention relates to a tensioning device for tensioning chains, straps, cables or similar tensioning means (1), having at least one tubular tensioning nut (2) and at least one threaded bolt (3) passing into the tensioning nut (2) and interacting therewith, wherein the threaded bolt (3) is equipped with at least one unscrewing prevention means (9; 10*a*, 10*b*, 11) at the end, and wherein the threaded bolt (3) is equipped at the end with a thread-free region (9) and a stop (10*a*, 10*b*, 11) adjoining thereto as the unscrewing prevention means (9; 10*a*, 10*b*, 11).

14 Claims, 1 Drawing Sheet

(56) References Cited

U.S. PATENT DOCUMENTS 11,333,220 B2   5/2022   Redder
2021/0356018 A1   11/2021   Dolezych

* cited by examiner

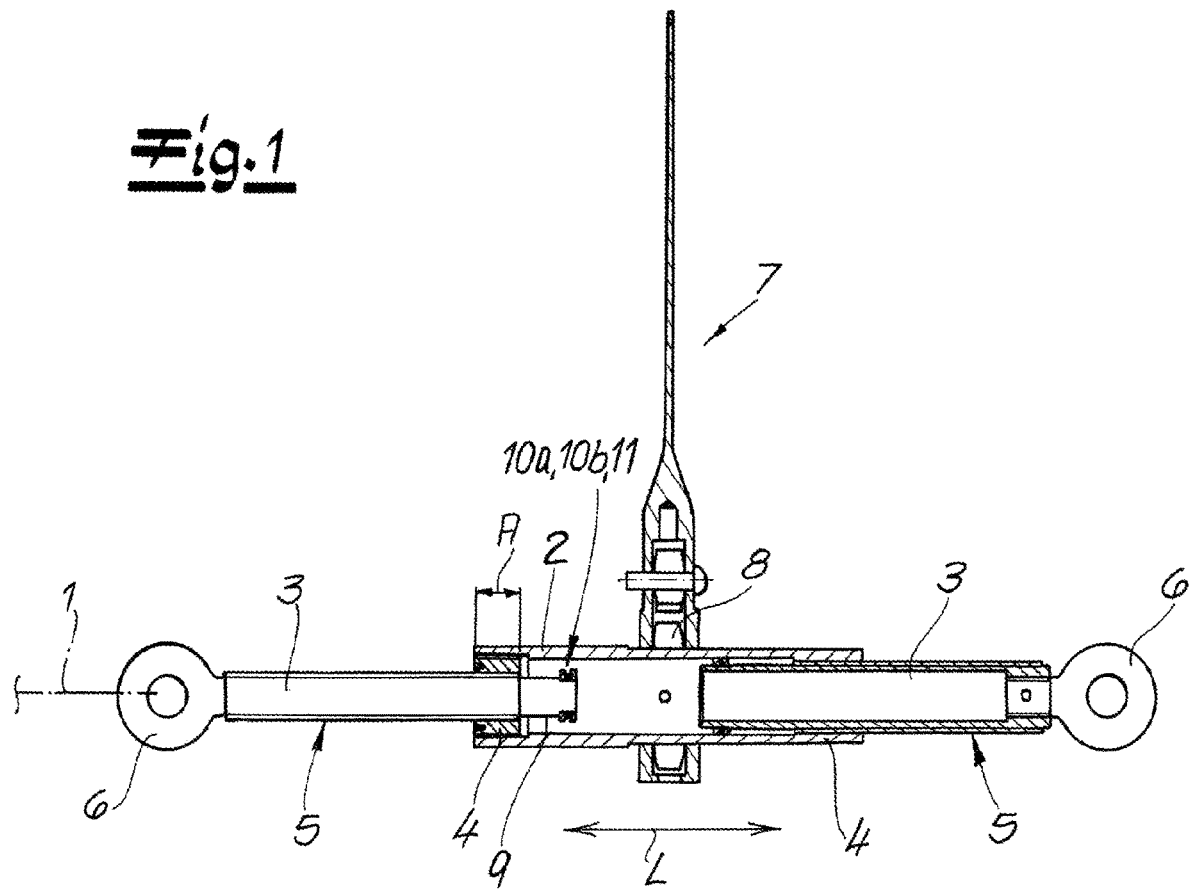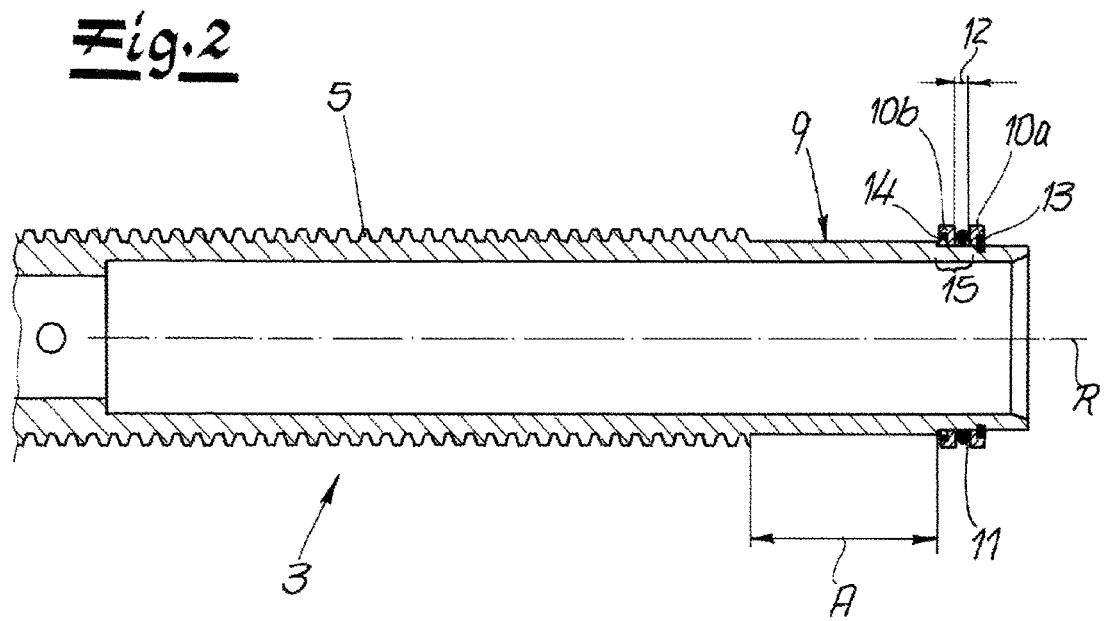

RATCHET TIGHTENER

CROSS REFERENCE TO RELATED APPLICATIONS

This application is the US-national stage of PCT application PCT/EP2021/073225 filed 23 Aug. 2021 and claiming the priority of German patent application 2020 20105227.6 itself filed 10 Sep. 2020.

FIELD OF THE INVENTION

The invention relates to a tightener for a chain, strap, or similar tension element and comprising at least one tubular tightening nut and at least one threaded bolt threaded into the tightening nut, the threaded bolt being equipped on an inner end with at least one unscrewing preventer.

BACKGROUND OF THE INVENTION

Such tighteners are typically used in the field of lifting and transport technology, that is to say in general logistics. The tension element to be tightened in this way is not limited to chains, belts, cables or the like. With its aid, for example, cargo can be secured on transport surfaces of transport vehicles. Conceivable transport vehicles are trucks, semi-trailers, towed trailers, etc. but also loading platforms of ships, containers, etc.

Because of the fields of use described, high tightening forces must often be exerted on the tension element with the aid of the tightener. For this purpose, the tightening nut is regularly equipped with a ratchet, as is described in detail in DE 20 2020 103 769 [WO 2020/202873] of applicant. In addition, the tightener can have one end connected to the tension element and an opposite movable end of the threaded bolt engaged with an eye on the loading surface or another fastening point. However, it is also possible for a tension element to be connected to each end of the tightener in order to provide the necessary hold-down force for securing the load on a transport surface.

A tightener of the above-described construction is described generically, for example, in U.S. Pat. No. 4,130,269. Here, two threaded bolts are engaged in opposite ends of the central and tubular tightening nut. The two threaded bolts have screwthreads on their inner ends and engage against a stop when a maximum extension length of the threaded bolt is reached. This action forms the desired unscrewing preventer.

However, with such tighteners, there is the problem that the screwthread in question is sheared or damaged when large tightening forces are applied. As a result, the unscrewing preventer can no longer carry out its desired function. In addition, the tightener is often irreparably damaged or expensive repair is required.

Such scenarios are increasingly observed in practice because, on the one hand, the applied tightening forces increase and, on the other hand, the tensioning travel increases. This can be attributed, inter alia, to the fact that not only steel chains with forged chain links are tensioned with the aid of the tightener described, but rather so-called textile chains are increasingly equipped with the required lashing force. Such textile chains are described, for example, in DE 20 2018 105 723 [US 2021/0135018] of applicant. They are distinguished by a high strength at the same time with a low weight, but tend to get twisted when the required tightening forces can be applied. As a result, large tightening lengths for the threaded bolt are required, which result in the respective threaded bolt moving against the unscrewing preventer.

Prior to comparable problems, the tightener according to the likewise generic WO 2018/073098 [U.S. Pat. No. 11,333,320] is available. In fact, end stops are provided at this point at the ends of threaded rods. This is a snap ring or a closing cover. Due to the disk-shaped or annular character of these end stops, a better introduction of force is observed in comparison with the device according to U.S. Pat. No. 4,130,269. However, damage is also possible in this case. In addition, the prior art does not give any feedback to the operator that the end stop is reached in order to prevent such damage. In this case, the invention seeks overall to provide a remedy.

OBJECT OF THE INVENTION

The object of the invention to develop such a tightener for chains, belts, ropes or the like in such a way that damage is avoided as far as possible and an operator is warned when the end stop is reached.

SUMMARY OF THE INVENTION

In order to attain this object, a tightener of the generic type in the context of the invention is characterized in that the threaded bolt is equipped at the end with an unthreaded region and an adjoining stop as an unscrewing preventer.

Thus, according to the invention, the invention works as before and unchanged with a stop, but combines the latter with the thread clearance. The unthreaded region is distinguished by the fact that the screw thread provided on the outer surface of the threaded bolt and is interrupted or removed in this region. As a result, the threaded bolt cannot transmit any force in the thread free region.

In detail, the tightening nut has in its interior at least one thread in which the threaded bolt is screwed. If the threaded bolt now reaches the thread in the tightening nut with its unthreaded region, the threaded bolt cannot be further rotated. For this purpose, the design is typically such that the unthreaded region of the threaded bolt has an axial length that substantially corresponds to the axial length of the screwthread that receives the threaded bolt in the tightening nut. As a result, the threaded bolt rotates freely as soon as its thread clearance reaches the thread in the tightening nut.

At the same time, during this process, the stop adjoining the unthreaded region in the direction of the end of the threaded bolt ensures that the threaded bolt is held in the tightening nut as before. As a rule, the stop is located at the inner end of the threaded bolt in the direction of rotation of the threaded bolt or in this region. On the other hand, the screwthread of the threaded bolt ends, namely merges, into the unthreaded region that is axially inwardly defined by the stop.

In any case, not only an effective unscrewing preventer is made available by this construction and the equipment of the threaded bolt with the unthreaded region, but at the same time an operator is informed when the stop or limit is reached. This is because the operator feels in the event that the unthreaded region of the threaded bolt reaches the thread path in the tightening nut, so that the threaded bolt in question can practically "spin" and not be rotated further, but rather runs axially against the stop. As a result, and at the same time effective rotation safety with the additional possibility is provided to inform the operator of the reaching of the stop or limit stop. The essential advantages are to be seen herein.

According to an advantageous embodiment, the unthreaded region is formed as a radial inset machined into the thread of the threaded bolt. This free stroke is, by definition, a removal of the rotationally symmetrical thread in a predetermined shape and with fixed masses. In fact, the radial insets can be introduced into the screwthread of the threaded bolt, for example, in such a way that the screwthread is removed in the unthreaded region to such an extent that the threaded bolt does not engage in the screwthread path in the tightening nut in a force-transmitting manner. As a result, the previously mentioned idling or "spinning" of the threaded bolt in relation to the tightening nut in the unthreaded region is explained.

The stop is advantageously annular. In addition, the design is usually such that the stop is equipped with a spring. The spring can advantageously be produced from an elastomer. As a result, the spring is constructed in a particularly simple and cost-effective manner. It has proven useful here if the spring is a ring. In the simplest case, the spring ring is therefore an elastomeric ring that is simple to produce and is available in a large number and consequently at low cost.

In addition, it has proven successful if the stop is formed in two parts with a fixed stop ring and a movable stop. As a rule, the stop is formed of a ring or as an annular stop, as has already been explained above. The fixed stop is then a fixed stop ring and the movable stop is a movable stop ring. The spring is advantageously between the fixed stop ring and the movable stop or between the fixed stop ring and the axially movable stop ring. Here, the design is usually such that the spring or spring ring, like the fixed stop ring and the axially movable stop ring, are coaxial with respect to one another and with a center axis of the nut.

The fixed stop ring is generally fixed on the threaded bolt and consequently cannot be axially displaced on the threaded bolt. In contrast, the axially movable stop ring is axially shiftable on the threaded bolt. In this case, it has proven successful if the movable stop ring (and the fixed stop ring) is/are received in a radial inset of the threaded bolt. Within this inset, the axially movable stop ring can move axially. This axial movement of the axially movable stop ring is expressly permitted according to the invention because the elastomeric spring ring is between the axially movable stop ring and the fixed stop ring and consequently absorbs axial movements of the axially movable stop ring with respect to the fixed stop ring in a resilient manner.

The two stop rings are each equipped with a respective mounting ring. In addition, the two stop rings usually are of L-shaped cross section. The design is then further such that the two short L-legs of the L-section stop rings engage radially over the respective mounting ring. As a result, the two short L-legs of the respective stop rings are directed axially oppositely away from each other and define between them a groove receiving the elastomeric spring ring.

As a result, a tightener is provided that is equipped with a particularly effective and, in particular, undamageable unscrewing preventer. Basically, it works because of the unthreaded region provided at the end of the threaded bolt with the adjoining stop as an unscrewing preventer. As soon as the threaded bolt reaches the unthreaded region during its screwing out, the threaded bolt is "screwed through" in the tightening nut with respect to the thread turn receiving it. In this case, the stop ensures that the threaded bolt cannot fall out of the screwthread.

Due to the design of the stop with the spring made of the elastomer that is advantageously provided at this point, it is additionally achieved that, when the threaded bolt is rotated out of the screwthread in the tightening nut, the last thread turn of the threaded bolt is left in each case and further rotation leads to an "engagement," because the spring of the stop always presses the threaded bolt slightly into the screwthread in the tightening nut. ? This procedure has the advantage that reaching the unscrewing preventer is not only detected haptically by an operator, namely by the previously mentioned "spinning" of the threaded bolt with respect to the tightening nut. Also, the recurring "clicking noise" additionally acoustically announces this process.

Finally, this special design ensures that the threaded bolt, upon reaching the unscrewing preventer, is easily moved back into the bolt screwthread. The interior of the tightening nut can be threaded in the opposite direction because the threaded bolt is pulled or introduced into the thread in the tightening nut by the (small) spring force acting in this direction. As a result, any cross threading of the threaded bolt in the screwthread in the tightening nut during the rescrewing of the threaded bolt into the tightening nut is practically ruled out.

As a result, any damage to the threaded bolt and the unscrewing preventer is excluded according to the invention on the one hand and, on the other hand, reaching of the unscrewing preventer is indicated both haptically and acoustically to the operator. This leads in connection with the alignment of the threaded bolt that is at the same time realized by the spring at the stop, in comparison with the screwthread in the tightening nut. The subsequent rescrewing of the threaded bolt into the tightening nut can be achieved without problems. All of this leads to an overall damage-free and consequently durable operation with a long service life that has hitherto is not found in the prior art.

BRIEF DESCRIPTION OF THE DRAWING

The invention is described in more detail below with reference to a drawing showing only one embodiment. Therein:

FIG. 1 shows the tightener according to the invention in an overview partially in section, and FIG. 2 shows the threaded bolt with the unscrewing preventer in detail, also partially in section.

SPECIFIC DESCRIPTION OF THE INVENTION

A tightener is shown in the drawing. The tightener is for chains, bands, cables or comparable tension element 1 shown schematically in FIG. 1. One such tension element 1 can be connected to each end of the tightener. In principle, however, the tension element 1 can also be connected to the tightener only on one end. The tightener is then connected, for example, with its other end to a loading surface or another fixed point. This is not shown in detail.

In its basic construction, the tightener first of all has at least one tubular tightening nut 2 that, according to this embodiment, is a tightening sleeve that extends longitudinally in the longitudinal or axial direction L. According to this embodiment, a bolt 3 is engaged in each end of the tightening nut 2. The bolts 3 are threaded into the tightening nut 2. For this purpose, the tightening nut 2 has on its opposite ends screwthreads 4 of opposite hand into which the bolts 3 engage with their respective complementary screw threads 5. In principle and preferably, however, the tightening nut 2 can also be equipped with only a single threaded bolt 3.

In this way, rotation of the tightening nut 2 in one direction of rotation results in the two threaded bolts 3 or one (single) threaded bolt 3 uniformly shifting relative to the tightening nut 2, specifically in or out in the axial longitudinal direction L. In this process, the tension element 1 is relaxed or tensioned. For this purpose, the threaded bolt 3 is equipped at its outer end with an eyelet 6 that can be coupled to the tension element 1 or also to a fixed point on the loading surface. The above-mentioned rotation of the tightening nut 2 for tensioning the tension element 1 is transmitted to the tightening nut 2 with the aid of a ratchet mechanism 7, 8. The ratchet mechanism 7, 8 has a tightening lever 7 with a tightening pawl that interacts with a toothed ring 8 fixed on the tightening nut 2 in a known manner.

In any case, the ratchet mechanism 7, 8 can rotate on the tightening nut 2 in the counterclockwise direction as well as in the clockwise direction. Depending on the design of the screwthreads 4, 5, this leads to the fact that the two threaded bolts 3 engage more into the tightening nut 2 or emerge therefrom, specifically in the axial direction or direction L. As a result, the tension element 1 or the two tension elements 1 is/are tensioned or relaxed.

So that rotation of the threaded bolt 3 that is on the left in this embodiment relative to the thread 4 on the inside of the tightening nut 2 does not lead to the threaded bolt being screwed out of the tightening nut 2, the threaded bolt 3 is equipped on its inner end with an unscrewing preventer 9; 10a, 10b, 11. For this purpose, the threaded bolt 3 has an unthreaded region 9 on the end and adjacent stop elements 10a, 10b, 11 that together form the unscrewing preventer 9; 10a, 10b, 11.

In this context, the unthreaded region 9 has an axial length A that corresponds substantially to the axial length of the screwthread 4 of the threaded bolt 3 in the tightening nut 2. This becomes clear in a comparison of FIGS. 1 and 2.

The unthreaded region 9 is a radial inset formed into the thread 5 of the relevant threaded bolt 3, that is to say a removal of the thread 5 in this region. This can be done and carried out, for example, by correspondingly machining off the thread 5 in the unthreaded region 9.

The stop elements 10a, 10b, 11 form an annular stop. In fact, the stop 10a, 10b, 11 has an annular shape, specifically with respect to an axis of rotation R common to the threaded bolt 3. Moreover, the stop 10a, 10b, 11 is equipped with a spring 11 that is made of an elastomer. In fact, the spring 11 is a spring ring made of an elastomeric plastic.

Furthermore, the stop 10a, 10b, 11, apart from the spring 11, is designed in two parts with a fixed stop ring 10a and a movable stop ring 10b. The stop 10a, 10b, 11 as a whole is an annular stop with the fixed stop ring 10a and the movable stop ring 10b. The spring ring 11 is between the fixed stop ring 10a and the axially movable stop ring 10b. For this purpose, the spring ring 11 is set in an inset or groove 12 formed by the two stop rings 10a, 10b.

With reference to the detailed illustration in FIG. 2, it can be seen that the fixed stop ring 10a is fixed on the threaded bolt 3. In contrast, the movable stop ring 10b can shift axially in the longitudinal direction L thereon. For this purpose, the axially movable stop ring 10b is guided axially displaceably on the threaded bolt 3. In addition, the axially movable stop ring 10b is set in an inset 15 of the threaded bolt 3. The same applies to the fixed stop ring 10a.

A respective mounting ring 13, 14 is associated with each of the two stop rings 10a, 10b. The mounting ring 13 thereon belongs to the fixed stop ring 10a, whereas the mounting ring 14 interacts with the axially movable stop ring 10b. In addition, both stop rings 10a, 10b are L-shaped in cross section.

In fact, the rings 10a, 10b have short L-legs that engage radially outwardly over the respective mounting rings 13, 14. Since both stop rings 10a, 10b furthermore have substantially the same outer diameter, the previously discussed groove 12 is formed between the two stop rings 10a, 10b, into which the spring 11 or the elastomeric spring ring 11 engages.

The mounting ring 13 of the fixed stop ring 10a engages in a groove on the outer surface of the threaded bolt 3 and is thereby axially fixed. The same applies to the fixed stop ring 10a. On the other hand, the mounting ring 14 of the axially movable stop ring 10b is axially displaceable in the inset 15 of the threaded bolt 3.

As soon as the threaded bolt 3 is rotated out of the tightening nut 2 up to the unscrewing preventer 9; 10a, 10b, 11, the axially movable stop ring 10b moves on the inside axially outward away from the thread 4 in the tightening nut 2. At the same time, the screwthread 4 moves completely into the unthreaded region because the axial length thereof corresponds to the axial length A of the unthreaded region 9.

Further rotation of the threaded bolt 3 now results in the spring 11 being compressed between the two stop rings 10a, 10b, because the axially movable stop ring 10b rests against the stop in the tightening nut 2 and can travel against the spring 11 by its axially movable mounting together with the mounting ring 14 within the inset 15 and compresses it slightly.

As a result, on the opposite end of the thread 4 in the tightening nut 2, the end of the thread 5 of the threaded bolt 3 leaves the thread 4, but is then pulled back into the thread 4 by the slightly relaxing spring 11. As a result, it is not only the result that the threaded bolt 3 "rotates" in this region, but at the same time a "clicking" noise is also observed, namely each time the end of the thread 5 emerges from the thread 4 in the tightening nut 2 and is again applied against the thread 4 by the relaxing spring. At the same time, the spring force applied by the spring 11 ensures that, in the opposite direction to the rotation of the threaded bolt 3, the thread 5 of the threaded bolt 3 engages smoothly into the thread 4 without problems and consequently cross-threading between the threaded bolt 3 and the tightening nut 2 is expressly not observed.

The invention claimed is:

1. A tightener for a chain, strap, cable or similar tension element, the tightener comprising:
   at least one tubular tightening nut; and
   at least one threaded bolt threaded into the tightening nut and having an inner end provided with an unthreaded region and a stop thereadjacent having a spring and forming with it the stop an unscrewing preventer.

2. The tightener according to claim 1, wherein the unthreaded region has an axial length that substantially corresponds to an axial length of a screwthread receiving the threaded bolt in the tightening nut.

3. The tightener according to claim 1, wherein the unthreaded region is of smaller diameter than a screwthread of the threaded bolt.

4. The tightener according to claim 1, wherein the stop is annular.

5. The tightener according to claim 1, wherein the spring is made of an elastomer.

6. The tightener according to claim 1, wherein the spring is a ring.

7. The tightener according to claim 1, wherein the stop has a fixed stop and a movable stop.

8. The tightener according to claim 7, wherein the fixed stop is a fixed stop ring and the movable stop is a movable stop ring.

9. The tightener according to claim 8, wherein the spring is between the fixed stop ring and the 2 axially movable stop ring.

10. The tightener according to claim 9, wherein the fixed stop ring is axially fixed on the threaded bolt.

11. The tightener according to claim 10, wherein the axially movable stop ring is axially displaceable on the threaded bolt.

12. The tightener according to claim 10, wherein both stop rings are received in a radial inset of the threaded bolt.

13. The tightener according to claim 9, wherein each stop ring is equipped with a respective mounting ring.

14. The tightener according to claim 9, wherein both stop rings are of L-section.

\* \* \* \* \*